May 28, 1963 W. B. WOODY ETAL 3,091,312
VEHICLE MOUNTED DERRICK
Filed June 10, 1959
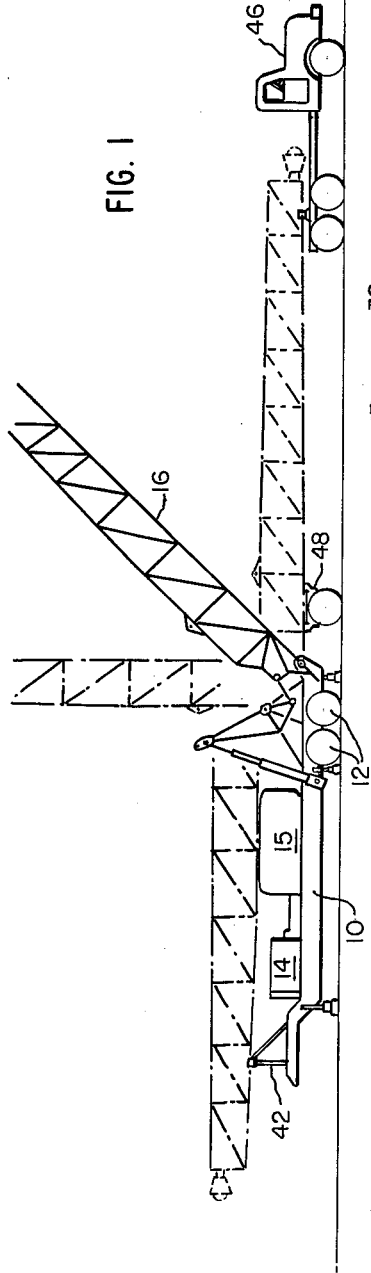
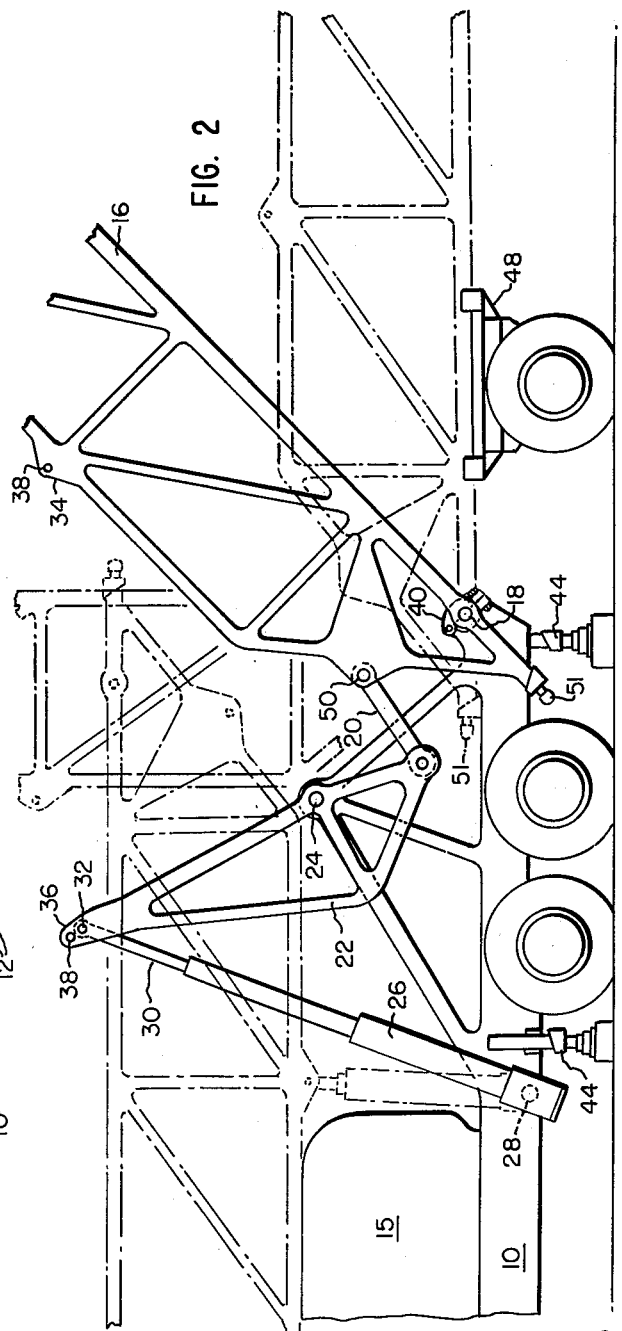
INVENTORS
WAYLAND B. WOODY
MERL G. SCOTT
MARVIN L. JONES
BY KENWAY, JENNEY, WITTER & HILDRETH
ATTORNEYS

United States Patent Office 3,091,312
Patented May 28, 1963

3,091,312
VEHICLE MOUNTED DERRICK
Wayland B. Woody, 1136 Crane Road, Merl G. Scott, P.O. Box 1101, and Marvin L. Jones, 525 Doucette, all of Pampa, Tex.
Filed June 10, 1959, Ser. No. 819,409
3 Claims. (Cl. 189—11)

This invention relates to vehicle mounted derricks, masts and the like commonly used in oil fields for well servicing and like operations requiring portability of the derrick and equipment from well to well. The equipment together with the derrick totals a substantial load which combined with other factors presents many problems to meet highway requirements. Such derricks are commonly mounted for pivotal movement on the equipment vehicle which includes power means for pivoting the derrick through 90° to and from horizontal carrying position on the vehicle and vertical operative position. An important feature of my invention resides in the provision of mechanism for pivoting the derrick through substantially 180° to three positions respectively disposing the derrick horizontally in one direction over and onto the vehicle, vertically, and to horizontal position in the opposite direction. In the last named position the derrick is disposed horizontally away from the vehicle and free to be received onto and transported by other vehicle means. The production of mechanism of this nature for thus facilitating independent transporting of the derrick when required to meet highway regulations comprises the primary object of the invention.

In accordance with the invention the derrick is mounted for two pivotal movements respectively between its two horizontal positions and its vertical position about two pivotal axes disposed horizontally and parallel at opposite sides of the derrick and transversely of the vehicle. The provision of such mounting of the derrick together with power means and connections therefrom to the derrick for effecting its said pivotal movements comprises a further object of the invention.

More specifically the invention embodies one or a pair of trusses pivotally mounted on the vehicle and disposed to support the derrick for pivotal movement to and from its vertical position and its horizontal position on the vehicle, together with means for pivotally supporting the derrick for pivotal movement to and from its vertical position and its horizontal position away from the vehicle. The provision of such mechanism together with disengageable connections between the trusses and derrick for effecting the derrick pivoting operations comprises a further object of the invention.

These and other features of the invention will be best understood and appreciated from the following description of a preferred embodiment thereof selected for purposes of illustration and shown in the accompanying drawings in which—

FIG. 1 is a side elevation of one embodiment of the invention and illustrating the functions performed, and
FIG. 2 is an enlarged fragmentary side elevation of mechanism comprising said embodiment of the invention.

In the drawing 10 indicates a heavy duty truck supported at its rear end on wheels 12 and carrying well servicing equipment including an engine 14 and winch mechanism 15. A derrick 16 is mounted on the rear end of the truck over the wheels 12 and is pivotally movable on the truck through substantially 180° to three positions respectively disposing the derrick horizontally forward over and onto the truck, vertically, and to horizontal position rearwardly from the truck. In the drawing I have illustrated one embodiment of the invention for thus pivoting the derrick and this embodiment will now be described.

As illustrated in the drawing, the derrick is supported on the truck for pivotal movement in a bearing 18 at the near side of the derrick and is connected by a link 20 to one end of a truss 22 pivotally supported on the truck at 24. A like bearing, truss and connections are provided at the far side of the derrick. A fluid operated power means comprising a cylinder 26 pivoted to the truck at 28 and including a piston rod 30 connected to the truss 22 at 32 is provided at each side of the derrick and truck. It will be apparent from the drawing that extending movement of the piston rods will pivot the trusses clockwise and move the derrick to vertical position and that retracting movement of the piston rods will lower the derrick to the right hand horizontal position illustrated.

The derrick is provided with an integral bracket 34 for each truss 22 and when the derrick is in vertical position the top end 36 of each truss is connected to its bracket by a removable pin extending through registering holes 38. The trusses are thus secured to the derrick at their top ends 32 and they are also secured to the derrick at their bottom ends by the links 20, thereby firmly securing the derrick to and for pivotal movement with the trusses. When it is desired to pivot the derrick forwardly onto the truck 10 the bearing supports at 18 are released by removing the removable caps 40 whereupon retraction of the piston rods 30 will pivot the trusses anti-clockwise and also the derrick forwardly to horizontal position on the truck and its derrick supporting structure 42.

It will be apparent that when the derrick is in vertical position and the pins inserted into the registering holes 38, the derrick will be firmly supported on the pivot bearings 24, allowing removal of the caps 40 at bearing supports 18. During the well servicing operations the rear end of the truck is supported by suitable jacks 44, and the entire weight of the derrick and its attached load is supported by suitable jacks 51 which are attached to the lower end of the derrick legs. When it is desired to transport the derrick 16 independently of the truck 10, the removable caps 40 are installed in place and the pins removed from the registering holes 38. The derrick will then be lowered into horizontal position rearwardly of the truck 10 and onto a motor truck 46 and a trailing dolly 48. When the derrick is thus positioned the bearings are released at 18 by removing the bearing caps 40 and the connecting links 20 are detached by removing the pins 50. The derrick is thereupon free for traveling movement with the truck 46.

It is noted that provision is made to connect each truss 22 to the derrick at opposite sides of the pivot axis 24 and thus the extending thrust movement of the piston rods 30 outwardly of their cylinders will function to raise the derrick from either of their horizontal positions, and retraction of the piston rods will serve to lower the derrick in either direction from the vertical. It will now be apparent that the invention provides for conveniently lowering the derrick onto the equipment truck 10 when it is desired thus to transport the derrick and for likewise conveniently lowering the derrick onto independent transporting means when conditions require such independent transportation.

Having thus disclosed our invention what we claim as new and desire to secure by Letters Patent is—

1. A truck mounted derrick comprising, in combination; a vehicle, a derrick, a truss pivotally mounted on a first axis on said vehicle, power means for pivoting said truss, a link pivotally connecting said truss with said derrick; bearing means for releasably supporting said derrick on said vehicle for pivotal movement about a second axis, and means for releasably securing said derrick on said truss for pivotal movement about said first axis, said derrick being adapted to be pivotally supported alternatively by said truss or said bearing means.

2. A truck mounted derrick comprising, in combination; a vehicle, a derrick, a truss mounted on said vehicle for pivotal movement about a first axis, power means for pivoting said truss, a link pivotally connecting said truss with said derrick, bearing means for releasably supporting said derrick on said vehicle for pivotal movement about a second axis by means of said truss from a first horizontal direction to a vertical direction, and means for releasably securing said derrick to said truss for pivotal movement about said first axis from the vertical direction to a horizontal direction opposite to said first horizontal direction, said derrick being adapted to be pivotally supported alternatively by said truss or said bearing means.

3. A truck mounted derrick comprising, in combination; a vehicle, a derrick, a truss pivotally mounted on a first axis on said vehicle, power means for pivoting said truss, a link pivotally connecting said truss with said derrick, bearing means releasably supporting said derrick for pivoting about a second axis by said truss from a first horizontal direction to a vertical direction, and removable pin means adapted to secure said derrick on said truss in the vertical position of said derrick, said derrick being pivotable about said first axis from the vertical position by said truss to an opposite horizontal direction upon the release of said derrick from said bearing means and the securing of said derrick by said pin means.

References Cited in the file of this patent
UNITED STATES PATENTS

| | | |
|---|---|---|
| 2,360,654 | Day | Oct. 17, 1944 |
| 2,904,310 | Leonard | Sept. 15, 1959 |
| 2,930,489 | Brown | Mar. 29, 1960 |